Nov. 28, 1950

B. WITTEN 2,531,487

ELECTROLYTIC PRODUCTION OF CACODYL

Filed March 29, 1943

Inventor

BENJAMIN WITTEN

By Joseph A. O'Connell and
Fred S. Lockwood

Attorneys

Nov. 28, 1950 — B. WITTEN — 2,531,487
ELECTROLYTIC PRODUCTION OF CACODYL
Filed March 29, 1943 — 2 Sheets-Sheet 2

Inventor
BENJAMIN WITTEN
By Joseph A. O'Connell and
Fred S. Lockwood
Attorneys

Patented Nov. 28, 1950

2,531,487

UNITED STATES PATENT OFFICE 2,531,487

ELECTROLYTIC PRODUCTION OF CACODYL

Benjamin Witten, Baltimore, Md., assignor to the United States of America as represented by the Secretary of War Application March 29, 1943, Serial No. 480,954

12 Claims. (Cl. 204—72)

(Granted under the act of March 3, 1883, as amended April 30, 1928; 370 O. G. 757)

The invention described herein may be manufactured and used by or for the Government for governmental purposes, without the payment to me of any royalty thereon.

This invention relates, generally, to improved methods of making cacodyl and it has particular relation to continuous methods of electrolytically reducing cacodyl oxide directly to cacodyl.

Until recently cacodyl and cacodyl oxide have only been made by small scale, batch methods. The original process of making cacodyl oxide and cacodyl, discovered by Cadet in 1760, and consisting of pyrolyzing a mixture of equal parts by weight of arsenic trioxide and potassium acetate, has, until recently, remained with only minor modifications, the only practical process of making these compounds. The product resulting from Cadet's reaction is known in the art as "Cadet's liquid," and consists of an inflammable mixture of about 60% cacodyl oxide and about 40% cacodyl.

In making cacodyl from Cadet's liquid, the mixture is usually first treated with concentrated hydrochloric acid and ferric or mercuric chloride, followed by steam distillation so as to produce cacodyl chloride. The cacodyl chloride may then be reduced with zinc to form cacodyl. The "yield" of the Cadet reaction is usually reported as the percentage of cacodyl formed, based on the amount of arsenic trioxide used, and the maximum yield obtainable on this basis is about 17%.

The batch process of Cadet and the various modifications thereof, and the conversion of Cadet's liquid to cacodyl, are objectionable for several reasons, and become increasingly so when it is necessary to make cacodyl on a quantity production basis. Among the more objectionable features and disadvantages of the Cadet process are the facts that: it is a batch process and has all of the inherent disadvantages of a batch process as compared with a continuous process; the yield is low, a 17% yield of cacodyl chloride based on the arsenic trioxide used being maximum; and the problem of disposing of the toxic arsenical residue is a serious nuisance. The conversion of Cadet's liquid involves the use of relatively expensive chemicals and is inefficient, the theoretical efficiency being only 60% since 40% of the Cadet's liquid is already cacodyl and this is converted to cacodyl chloride and reduced again to cacodyl along with the 60% cacodyl oxide.

Recently an improvement has been provided in the means of producing cacodyl which, briefly stated, consists of a continuous, catalytic method of making cacodyl oxide in high yields. Briefly, this continuous, catalytic process comprises passing the vapors of acetic acid or acetic anhydride and the vapors of arsenic trioxide over a heated catalyst to form cacodyl oxide. The details of this continuous process of producing cacodyl oxide will be described in detail hereinafter in connection with the present invention.

Prior to the present invention, however, there has not been any completely continuous process of producing cacodyl, as distinguished from cacodyl oxide, and Cadet's liquid which consists of a mixture of cacodyl oxide and cacodyl.

Accordingly, one very important object of this invention is the provision of a completely continuous process of making cacodyl.

Another very important object of this invention is a continuous process of making cacodyl wherein the only reactants or chemicals required are arsenic trioxide, acetic acid or acetic anhydride, and a catalyst.

Another important object of this invention is the provision of a continuous process of making cacodyl wherein acetic acid has the dual function of serving as a reactant with arsenic trioxide and as a preferential solvent for cacodyl oxide in the step of continuously electrolytically reducing cacodyl oxide to cacodyl. Another important object of the invention is the provision of improvements in methods of making cacodyl whereby the cost of this product is considerably reduced.

Still another important object of this invention is the provision of continuous methods of electrolytically reducing cacodyl oxide to cacodyl in an electrolytic cell and continuously withdrawing cacodyl formed, thereby eliminating the multi-step process of converting cacodyl oxide or Cadet's liquid to cacodyl chloride with subsequent reduction of the chloride to cacodyl.

Other objects and advantages of the invention will, in part, be obvious and will, in part, appear hereinafter.

For a more complete understanding of the nature and scope of this invention, reference may be had to the following detailed description thereof, setting forth by way of illustration certain specific procedures and reactants, taken in connection with the accompanying drawings in which.

Figure 1:
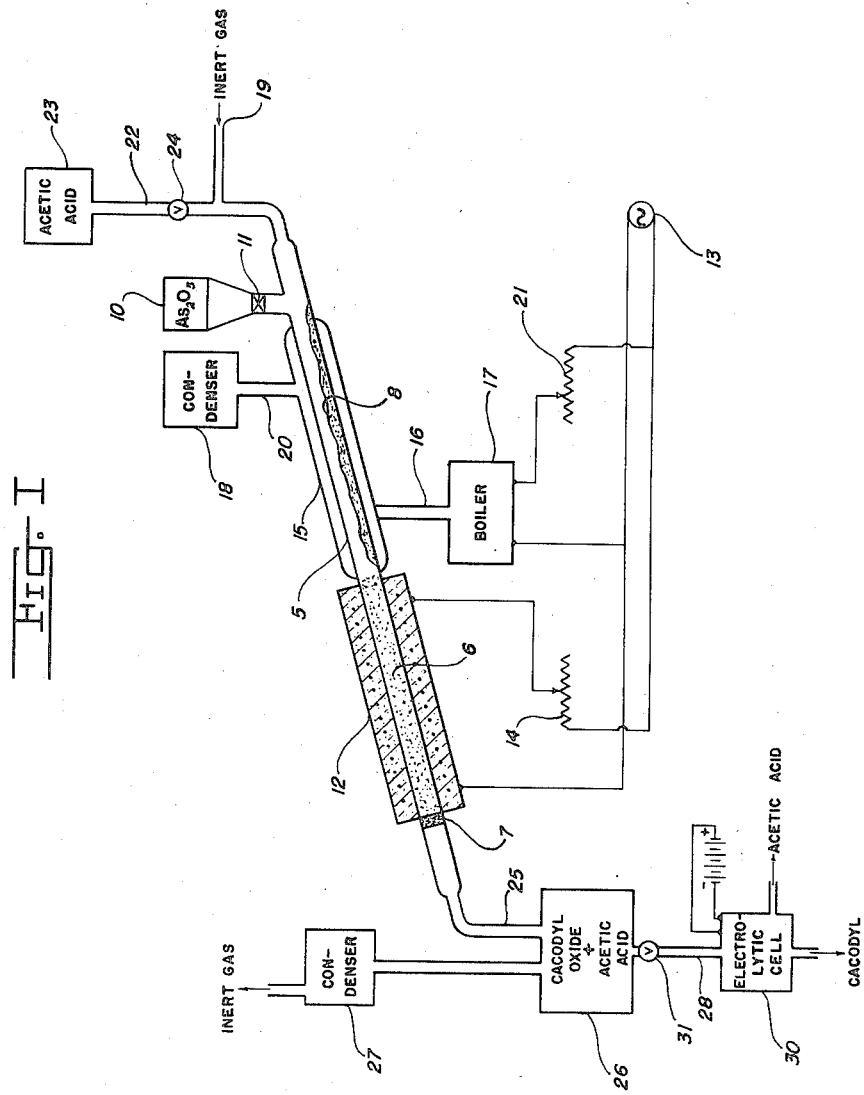
Figure 1 is a flow sheet illustrating a continuous process of making cacodyl from acetic acid and arsenic trioxide.

Referring to Figure 1, a reaction chamber in the form of a slanting tube 5, which may be made of Pyrex glass, is shown. Approximately the lower half of the tube 5 is filled with a catalyst body 6 in granular or subdivided form and held in place by a porous asbestos plug 7. In the upper half of the reaction chamber 5, arsenic trioxide is distributed as indicated at 8. The arsenic trioxide may be fed into the reaction chamber 5 from a hopper 10 which is provided with a rotatable feeder 11. Additional quantities of arsenic trioxide may be fed into the tube 8 as desired from the hopper 10 by turning the feeder 11. The feeder 11 also serves to seal off the hopper 10 from the reaction chamber 5 regardless of the position to which it is turned.

It is necessary, in order for the reaction to proceed, that the catalyst body 6 be heated. Accordingly, an electrical heating unit 12 is disposed around the lower half of the tube 5 in heat conductive relationship with the catalyst body 6, as shown. The heater 12 is connected for energization in electrical circuit relationship with a source of alternating current as indicated at 13. An adjustable resistor 14 is connected in series circuit relation between the source of current 13 and the heater 12 whereby the heat output and temperature of the heater 12 may be regulated as desired.

In order to sublime the deposit of arsenic trioxide 8 at a uniform rate, a heating jacket 15 is sealed around the upper half of the tube 5, as shown. The jacket 15 is connected at its lower end by means of a conduit 16 to an electrically heated boiler 17 which serves as a source of hot vapors. The vapors from the boiler 17 flow through the jacket 15 and heat the arsenic trioxide 8 so as to sublime the same. The vapors from the jacket 15 are condensed in a condenser indicated at 18 which is connected with the upper end of the jacket 15 by means of a conduit 20.

The boiler 17 is electrically connected for energization with the source of current 13 through an adjustable resistor 21 connected in series circuit relationship with the source 13, as shown. The adjustable resistor 21 permits the adjustment of the temperature and heat output of the boiler 17 as desired. The boiler 17 contains a liquid such as diphenyl ether or diethylphthalate, which boil at 259° C. and 296° C., respectively. Other liquids having suitable boiling points may also be used in the boiler 17. The arsenic trioxide 8 sublimes at about 193° C. at a uniform rate when the vapors thereof are continuously removed so that the partial pressure of arsenic trioxide will not repress continued sublimation at this temperature.

The upper end of the tube 5 is connected by means of a conduit 22 with a tank 23 which serves to hold a supply of acetic acid or acetic anhydride. A valve 24 is provided in the conduit 22 whereby the supply of acetic acid or acetic anhydride to the reaction chamber 5 may be regulated. As the acetic acid or acetic anhydride flows into the upper end of the tube 5 from the tank 23 it vaporizes on reaching the heated portion of the reaction chamber.

In order to sweep the reactant vapors of acetic acid and arsenic trioxide through the apparatus, the conduit 22 is connected with a source of inert gas under pressure, such as nitrogen or carbon dioxide, as indicated at 19. The inert gas serves to sweep or carry reactant vapors through the tube 5 including the catalyst body 6 where the vapors react to form cacodyl oxide. The lower end of the tube 5 is connected by means of a conduit 25 with a tank or holder 26 wherein the condensed vapors of cacodyl oxide and acetic acid issuing from the reaction chamber 5 may be collected. The holder 26 is provided with a condenser 27 in which the vapors of cacodyl oxide and acetic acid may be condensed. The tank or holder 26 is further connected by means of a conduit 28 with an electrolytic cell 30 wherein the cacodyl oxide may be continuously reduced to cacodyl and separated from the acetic acid as will be described hereinafter in connection with Figure 2 of the drawings. The conduit 28 is provided with a valve 31 by means of which the supply of cacodyl oxide and acetic acid from the holder 26 to the electrolytic cell may be regulated as desired.

The catalytic reaction which takes place in the catalyst body 6 between the vapors of acetic acid or acetic anhydride and arsenic trioxide result principally in the production of cacodyl oxide. However, in certain runs an appreciable amount of cacodyl may also be formed. It is thought that the composition of the product resulting from the catalytic reaction, in respect to the amounts of cacodyl oxide and cacodyl depends largely on the quantity of arsenic metal which is deposited on the catalyst during the course of the reaction; the arsenic acting as a reducing agent and tending toward the formation of the diarsine product.

In carrying out the catalytic reaction it has been found that there may be considerable range in such factors as the strength of the acetic acid or acetic anhydride used, the temperature at which the catalyst body is maintained, the type of catalyst, and the rates at which the reacted vapors are conducted through the catalyst body.

Experience to date indicates that acetic acid of from 50% strength to full strength may be used and satisfactory yields obtained. The presence of water vapor in the mixture being passed over the catalyst tends to slow down the rate of the reaction, but diminishes the rate of reduction of the arsenic trioxide by the acetic acid, the approximate maximum desired effect appearing to be obtained with acetic acid of about 75% strength.

Generally stated, the catalyst may be an alkali metal salt or hydroxide which will react with the acetic acid or acetic anhydride to form the alkali metal salt thereof. Also an alkali metal acetate may be used as a catalyst. It appears that the lower members of the alkali metal series of the periodic table, such as cesium and potassium provide the best catalysts, whereas the upper members of the series, such as sodium and lithium do not serve as well. Specifically cesium carbonate, potassium carbonate, cesium acetate and potassium acetate provide the better catalysts. However, satisfactory yields may be obtained with the corresponding sodium and lithium salts.

The catalyst should be supported upon some inert support of material such as pumice or asbestos string. The catalyst may be prepared by allowing the support, such as pumice or asbestos string, to stand for several hours in a concentrated solution of the particular catalytic compound to be used. After standing for the desired time, the excess solution may be decanted and the catalyst dried, either by standing in the air or in a vacuum oven. It appears that a better catalyst is obtained when the drying thereof is carried out in a vacuum oven at about 100° C. Pumice of from No. 6 to No. 10 mesh has been satisfactorily used as a support.

The catalysts have a long life and do not seem to deteriorate over long periods of reaction. When degenerated, the catalysts may be readily regenerated by discontinuing the reaction and "burning out" the catalysts by passing hot air therethrough at the reaction temperature. When the catalyst used is a carbonate, experience has indicated that it is advisable to first partially convert this compound to the acetate before passing the vapors of arsenic trioxide therethrough. Otherwise, if the reactant vapors are passed through the catalyst before a preliminary conversion to the acetate, the sudden evolution of carbon dioxide from the carbonate catalysts on heating will cause some of the arsenic trioxide and acetate vapor to pass through unchanged during the early stages of the reaction.

It has been found that satisfactory yields may be obtained when the temperature of the catalyst is within the range of 300° C. to 450° C. However, generally speaking, from 300° to 400° C. appears to be the better temperature range, and a temperature of around 350° C. seems to be the most satisfactory. These temperatures were measured on the outside of the tube 5 of the apparatus shown in Figure 1.

The rate at which the reactant vapors should be passed through the catalyst is related to some extent to the temperature thereof. That is, if the reactants are passed through at a slow rate when the catalyst is at an elevated temperature of around 400° C. or above, the yield is considerably diminished by the decomposition of the product into metallic arsenic and hydrocarbons. At these elevated temperatures, increases in the rate at which the reactants are supplied give increased yields, probably due to the cooling effect of the reactant vapors upon the catalyst body. At temperatures below approximately 375° C. the rate at which the reactants are supplied so long as it is slow enough to allow complete reaction of the arsenic trioxide, appears to have little influence upon the yields.

The exact proportion in which the reactant vapors are used has been found to have little effect upon the yield so long as an excess of the acetic acid or anhydride above that required for reaction with the arsenic trioxide is employed. The minimum amount of acetic acid or anhydride which must be used should be enough to completely react with the arsenic trioxide and an excess should remain which upon condensation will be sufficient to completely dissolve the condensed cacodyl oxide formed. It has been found that usually 10 moles of acetic acid per mole of arsenic trioxide may be used, the theoretical amount of the acetic acid required being 4 moles. When acetic acid of 75% strength is used satisfactory yields have been obtained when the reactant vapors are in the proportion of from 3 to 11 parts by weight of acetic acid to one part by weight of arsenic trioxide.

It has been indicated that acetic anhydride may be used in place of acetic acid. However, at the present time, the yields with acetic anhydride have not been as high as those obtainable with acetic acid. The highest yield to date obtainable with the above described catalytic reaction using acetic acid and cesium carbonate catalyst, has been 77% of cacodyl chloride on the basis of arsenic trioxide consumed. The factors of the run producing this maximum yields were: a 75% strength acetic acid, a catalyst temperature of about 325° C. and reactant vapors in the proportion of about 5 parts by weight of acetic acid to one part by weight of arsenic trioxide. Upon further development, it is thought that even higher yields may be obtained.

Figure 2:
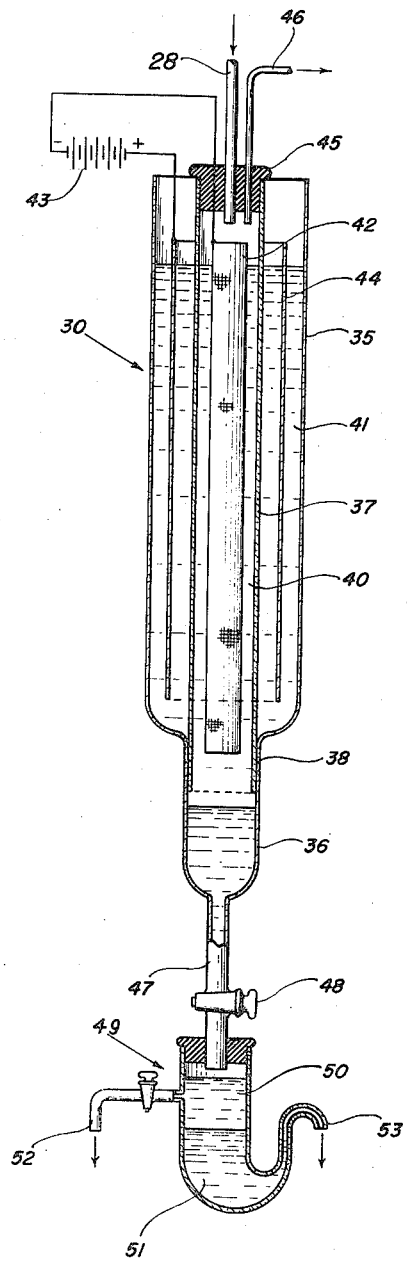
Figure 2 is a partial vertical sectional view of an electrolytic cell for use in connection with the apparatus of Figure 1 for continuous reduction of cacodyl oxide to cacodyl; and, Figure 3 is a partial vertical sectional view of a second form of electrolytic cell wherein Cadet's liquid may be continuously reduced to cacodyl.

Reference may now be had to Figure 2 of the drawings for a detailed description of the manner in which the solution of cacodyl oxide in acetice acid from the holder 26 (Figure 1) may be electrolytically reduced so as to form cacodyl. The electrolytic cell 30 comprises an outer jacket or container 35 made of a chemically resistant material such as porcelain or glass. The lower end of the container 35 decreases in diameter to form a reduced diameter portion 36. A cylindrical diaphragm 37 of porous material, such as unglazed porcelain, is disposed within the outer container 35 and is joined thereto by a fluid-tight seal at 39. The diaphragm 37 serves to divide the cell 30 into a cathode compartment 40 and an annular anode compartment 41. The anode compartment 41 may be filled with an electrolyte such as sulfuric acid, and the cathode compartment is filled with the cacodyl oxide-acetic acid solution from the tank 26 which is introduced into the cathode compartment from the conduit 28. The sulfuric acid should have a concentration such that the density thereof will be approximately equal to that of the cacodyl oxide solution in the cathode compartment. A cathode 42 in the form of a cylinder of platinum gauze is disposed within the cathode compartment 41 and is electrically connected with the negative terminal of a source of direct current, indicated at 43. The anode compartment is provided with a cylindrical platinum anode 44 which is electrically connected with the positive terminal of the source of current 43. The cathode compartment 40 has a cover 45 provided with a gas outlet 46. Although the factors of operation of the cell 30 may be widely adjusted, satisfactory operation has been obtained when a voltage of about 7 volts was used with a current density at the cathode 42 of from about 0.14 to 0.35 amper per square inch. During the operation of the cell 30, the cacodyl oxide is continuously reduced at the cathode 42 so as to form small globules or droplets of cacodyl. The reduction takes place smoothly, the cathode remains clean, and the cathode solution remains colorless. Since cacodyl is insoluble in acetic acid and has a greater specific gravity than the cathode solution, the droplets of cacodyl drop through the cathode compartment into the lower end of the cell. During the electrolysis, the entire contents of the long narrow cathode compartment 40 are drained through an outlet 47 provided with a stopcock 48 into a separator 49 at such a rate that substantially all of the cacodyl oxide will have been reduced to cacodyl while dropping through the length of the cell 30. Fresh cacodyl oxide solution is added from tank 26 at the same rate the contents are drained out of the cell 30.

The outlet 47 dips into the upper end of the separator 49, as shown. In the separator 49 the acetic acid and cacodyl separate into two layers 50 and 51, respectively. The spent acetic acid layer 50 may be continuously withdrawn through an outlet 52 while the cacodyl layer 51 may be continuously withdrawn through an outlet 53.

The spent acetic acid withdrawn at 52 may be fractionated, or fortified with glacial acetic acid or acetic anhydride, to bring the concentration up to about 75% strength so that it may be returned to the acetic acid supply tank 23 (Fig. 1) for reuse in the system.

The cacodyl withdrawn at 53 is a light amber product having a purity of about 98% based on total arsenic. The amount of cacodyl oxide present in the product runs considerably less than 5%. Based on the weight of cacodyl oxide introduced into the cell 39, the yield of cacodyl obtained from the electrolytic reduction process in the cell, is about 90%. Accordingly, with a 77% yield of cacodyl oxide based on arsenic trioxide, and the 90% conversion of the cacodyl oxide to cacodyl, the continuous process outlined in connection with Figures 1 and 2 is capable of a yield of 69% cacodyl based on arsenic trioxide. It is reasonably certain that with further developments in respect to details of operation and equipment, that even higher yields may be obtained.

The continuous process of making cacodyl described in connection with Figures 1 and 2 may be summed up in the following schematic equation:

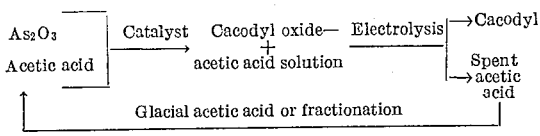

From the foregoing, it will be seen that a completely continuous process of producing cacodyl has been provided by this invention. The only chemicals that are consumed are acetic acid and arsenic trioxide, and by returning the spent acetic acid through the system there is practically no waste or loss of chemicals in the process whatsoever.

It will be seen that the two-fold use of acetic acid in the continuous process is a very important feature of the invention. The acetic acid serves both as a reactant for the arsenic trioxide and as a selective solvent for cacodyl oxide but not for cacodyl in the electrolytic reduction step. By using an excess of acetic acid vapor over that stoichiometrically required for reacting with the arsenic trioxide, it is possible to obtain complete reaction of all of the arsenic trioxide vapor while at the same time this excess acetic acid upon condensation serves as a solvent for the cacodyl oxide.

It is very significant and of great importance that the acetic acid is a solvent for the cacodyl oxide but not for cacodyl. By reason of this fact, the electrolytic reduction of the cacodyl oxide may be stopped at the cacodyl stage by reason of its separation from the acetic acid, otherwise, the reduction would continue and the final product would be dimethyl arsine. Furthermore, in spite of the fact that cacodyl oxide is miscible in all proportions with cacodyl, very little, if any, cacodyl oxide is found dissolved in the cacodyl formed. The explanation offered for the preferential solubility of cacodyl oxide in acetic acid is that a reaction takes place between cacodyl oxide and acetic acid in which cacodyl acetate is formed. The cacodyl acetate then ionizes to form cacodyl and acetate ions. The cacodyl ion is soluble in acetic acid but insoluble in cacodyl. However, whatever the explanation, the fact remains that pure cacodyl can be prepared in almost quantitative yields by the electrolytic reduction of cacodyl oxide.

It will be understood that the apparatus in the system described above in connection with Figures 1 and 2 of the drawings are illustrative and it is not intended to limit the invention thereto. Certain other systems and plants may be provided which utilize the basic principle of this invention which comprises catalytically reacting the vapors of acetic acid with the vapors of arsenic trioxide to form cacodyl oxide, condensing the cacodyl oxide and excess acetic acid vapor to form a solution of cacodyl oxide and acetic acid, continuously electrolytically reducing the cacodyl oxide to cacodyl, separately withdrawing the cacodyl and acetic acid formed, and returning the spent acetic acid into the system.

Figure 3:
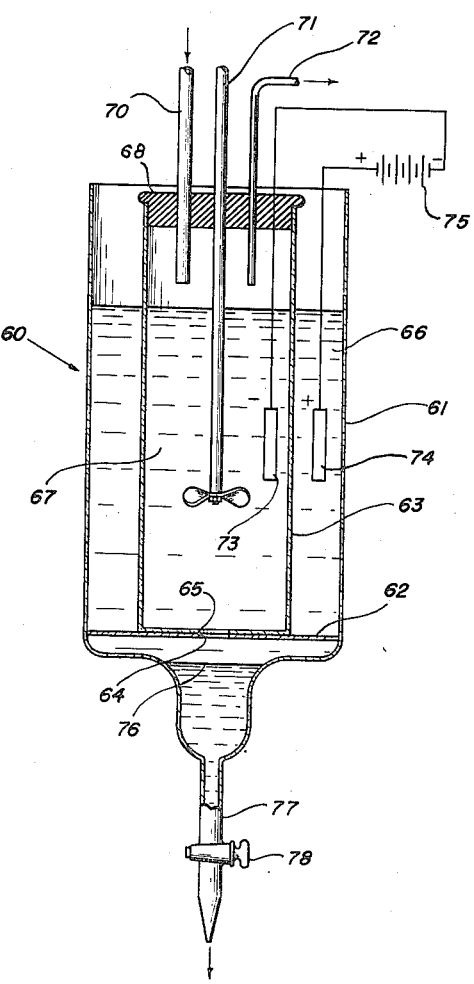

Reference may now be had to Figure 3 of the drawings wherein an electrolytic cell is indicated generally at 60 which is adapted to carry out the continuous conversion of Cadet's liquid into cacodyl. The cell 60 comprises an outer vessel 61 which may be made of glass or other chemically resistant material, provided with a support partition 62 in the bottom thereof. A porous cup 63 of unglazed porcelain is supported upon the partition or support 62 and securely attached thereto. Both the partition 62 and the bottom of the cup 63 are provided with registering apertures 64 and 65, respectively. The cup 63 and support 62 serve to divide the cell 60 into an anode compartment 66 and a cathode compartment 67. The anode compartment 67 is sealed from the atmosphere with a stopper 68 of rubber or some inert material, as shown. Cadet's liquid is introduced into the cathode compartment 67 from an inlet 70. The cathode compartment 67 is further provided with an agitator 71 and a gas outlet 72.

The cathode compartment is filled with acetic acid while the anode compartment 66 is filled with sulfuric acid having substantially the same specific gravity as the acetic acid. A platinum cathode 73 and platinum anode 74 are provided in the cathode compartment 67 and anode compartment 66, respectively and are connected in electrical circuit relationship, respectively, with the negative and positive terminals of a source of direct current indicated at 75.

As Cadet's liquid (comprising a mixture of about 40% cacodyl and 60% cacodyl oxide) is introduced into the cathode compartment 67, the cacodyl, which is insoluble in acetic acid, separates therefrom and collects in a layer 76 in the bottom of the cell 60, as shown. The cacodyl oxide portion of the Cadet's liquid dissolves in the acetic acid and is continuously reduced to cacodyl at cathode 73. After the cacodyl is formed it separates in small droplets and also collects in the layer 76 at the bottom of the cell 60. The layer of cacodyl 76 is not affected by the agitation of the contents of the cathode compartment 67 and may be withdrawn through the outlet 77 of the cell 60, which is provided with a stopcock 78.

The air in the cathode compartment 67 is preferably displaced with an inert gas such as carbon dioxide or nitrogen so as to prevent reaction with the cacodyl. A voltage of about 7 volts may be used with a current density at the cathode of about 0.08 ampere per square inch. It will be understood that other voltages and current densities may be used. After several hours of operation, the acetic acid in the cathode compartment 67 becomes discolored and the same should be renewed from time to time.

It was found that when Cadet's liquid formed by the Cadet reaction by pyrolyzing a mixture of equal parts by weight of arsenic trioxide and potassium acetate was introduced directly into the cell 60, a red coating was deposited upon the cathode 73, and after standing, that cacodyl withdrawn from the cell 60 deposited a red oil. It was found that instead of introducing the Cadet's liquid directly, it should be fractionated before introduction into the cell 60 so as to remove the high boiling impurities causing the red deposit on the cathode 73 and the red coloration of the cacodyl product. When fractionated, Cadet's liquid is electrolytically reduced in the cell 60, no deposit is left on the cathode 73, and this element remains clean throughout, and the cacodyl product remains a light amber color with the complete absence of any red coloration.

The efficiency of the cell 60 is relatively high and, based on the weight of the distilled Cadet's liquid introduced thereinto, the yield of cacodyl obtained is about 79%. The cacodyl product contains substantially no cacodyl oxide and at least 95% of it boiled in the range for pure cacodyl of 161° C. to 165° C.

The preferred process of converting Cadet's liquid to cacodyl described in connection with the cell 60 of Figure 3 may be represented schematically as follows:

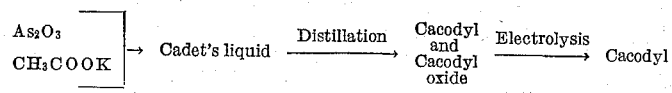

It will be seen that both the cell 30 of Figure 2 and the cell 60 of Figure 3 provide for the continuous electrolytic reduction of cacodyl oxide or Cadet's liquid to cacodyl without the use of such chemicals as ferric or mercuric chloride and zinc, which were heretofore required. The reduction takes place smoothly in one step with high yields and on a continuous basis. Thus, the prior art requirement of first treating cacodyl oxide or Cadet's liquid with hydrochloric acid, then ferric or mercuric chloride, followed by steam distillation so as to produce cacodyl chloride, and then reducing of cacodyl chloride with zinc to cacodyl is eliminated.

The strength of the acetic acid used in either of the electrolytic cells 30 or 60 does not appear to be critical. The concentration of the acetic acid in the distillate collected in the holder 26 (Fig. 1) usually runs about 60% and this has been found to be entirely satisfactory. However, acetic acid of about 45% has also been found to be satisfactory. The acetic acid used as a solvent in the cell 60 may be replaced with other solvents in which cacodyl oxide is soluble, but in which cacodyl is insoluble.

Since certain further changes may be made in the foregoing processes, systems, and materials without departing from the scope and spirit of the invention, it is intended that all matter described hereinabove shall be interpreted as illustrative and not in a limiting sense.

I claim as my invention:

1. The method of converting cacodyl oxide to cacodyl which comprises dissolving the cacodyl oxide in acetic acid, electrolytically reducing the cacodyl oxide to cacodyl in the cathode compartment of an electrolytic cell, permitting the cacodyl to separate from the acetic acid, and withdrawing the cacodyl.

2. The method of continuously converting cacodyl oxide to cacodyl which comprises dissolving the cacodyl oxide in acetic acid, electrolytically reducing the cacodyl oxide to cacodyl in the cathode compartment of an electrolytic cell, permitting the cacodyl to separate from the acetic acid in a separate layer, and withdrawing the cacodyl.

3. The method of continuously converting Cadet's liquid to cacodyl which comprises introducing Cadet's liquid into the cathode compartment of an electrolytic cell containing acetic anhydride in which cacodyl oxide is preferentially soluble but in which cacodyl is insoluble, electrolytically reducing the cacodyl oxide fraction of the Cadet's liquid to cacodyl in the cathode compartment, permitting the cacodyl fraction of Cadet's liquid and the cacodyl formed by electrolytic reduction of cacodyl oxide to separate from said anhydride as a separate layer, and withdrawing the cacodyl layer.

4. The method of continuously converting Cadet's liquid to cacodyl which comprises introducing Cadet's liquid into the cathode compartment of an electrolytic cell containing acetic acid, electrolytically reducing the cacodyl oxide fraction of the Cadet's liquid to cacodyl in the cathode compartment, permitting the cacodyl fraction of Cadet's liquid and the cacodyl formed by electrolytic reduction of cacodyl oxide to separate from the acetic acid as a separate layer, and withdrawing the cacodyl layer.

5. The method of continuously converting a solution of cacodyl oxide and acetic acid to cacodyl and acetic acid which comprises introducing continuously the solution of cacodyl oxide and acetic acid into the cathode compartment of an electrolytic cell, electrolytically reducing the cacodyl oxide to cacodyl, permitting the cacodyl thus formed to separate from the acetic acid and separately withdrawing the cacodyl and acetic acid.

6. The continuous method of making cacodyl which comprises reacting the vapors of arsenic trioxide with an excess of acetic acid vapors in the presence of a catalyst so as to form a solution of cacodyl oxide in the excess of condensed acetic acid, introducing the solution of cacodyl oxide and acetic acid into the cathode compartment of an electrolytic cell, electrolytically reducing the cacodyl oxide to cacodyl, permitting the cacodyl thus formed to separate from the acetic acid, and separately withdrawing the cacodyl and acetic acid.

7. The continuous method of making cacodyl which comprises, reacting the vapors of arsenic trioxide with an excess of acetic acid vapors in the presence of a catalyst comprising an alkali metal salt which will react with the acetic acid to form the alkali metal salt thereof while maintaining the catalyst at a temperature within the range of 300° C. to 450° C. so as to form cacodyl oxide, condensing the vapors of the cacodyl oxide formed and the vapors of the excess acetic acid to form a solution of cacodyl oxide in acetic acid, introducing the solution of cacodyl oxide and acetic acid into the cathode compartment of an electrolytic cell, electrolytically reducing the cacodyl oxide to cacodyl, permitting the cacodyl thus formed to separate from the acetic acid, and separately withdrawing the cacodyl and acetic acid.

8. The continuous method of making cacodyl which comprises reacting the vapors of arsenic trioxide with an excess of vapors of acetic acid in the presence of potassium carbonate catalyst at a temperature within the range of 300° C. to 400° C. so as to form cacodyl oxide, condensing the vapors of cacodyl oxide and the vapors of the excess acetic acid so as to form a solution of cacodyl oxide in acetic acid, introducing the solution of cacodyl oxide and acetic acid into the cathode compartment of an electrolytic cell, electrolytically reducing the cacodyl oxide to cacodyl, permitting the cacodyl thus formed to separate from the acetic acid, and separately withdrawing the cacodyl and acetic acid.

9. The continuous method of making cacodyl which comprises reacting the vapors of arsenic trioxide with an excess of vapors of acetic acid in the presence of cesium carbonate catalyst at a temperature within the range of 300° C. to 400° C. so as to form cacodyl oxide, condensing the vapors of cacodyl oxide and the vapors of the excess acetic acid so as to form a solution of cacodyl oxide in acetic acid, introducing the solution of cacodyl oxide and acetic acid into the cathode compartment of an electrolytic cell, electrolytically reducing the cacodyl oxide to cacodyl, permitting the cacodyl thus formed to separate from the acetic acid, and separately withdrawing the cacodyl and acetic acid.

10. The continuous method of making cacodyl which comprises passing the vapors of about 75% strength acetic acid and of arsenic trioxide in the ratio of about one part by weight of arsenic trioxide vapor to from about 3 to 11 parts by weight of the acetic acid vapor over potassium carbonate as a catalyst while maintaining the catalyst at a temperature within the range of from 300° C. to 400° C. so as to form cacodyl oxide, condensing the vapors of cacodyl oxide and the vapors of the excess acetic acid so as to form a solution of cacodyl oxide in acetic acid, introducing the solution of cacodyl oxide and acetic acid into the cathode compartment of an electrolytic cell, electrolytically reducing the cacodyl oxide to cacodyl, permitting the cacodyl thus formed to separate from the acetic acid, separately withdrawing the cacodyl and acetic acid, and reusing the separated acetic acid for reaction with more arsenic trioxide.

11. The continuous method of making cacodyl which comprises passing the vapors of about 75% strength acetic acid and of arsenic trioxide in the ratio of about one part by weight of arsenic trioxide vapor to from about 3 to 11 parts by weight of the acetic acid vapor over cesium carbonate as a catalyst while maintaining the catalyst at a temperature within the range of from 300° C. to 400° C. so as to form cacodyl oxide, condensing the vapors of cacodyl oxide and the vapors of the excess acetic acid so as to form a solution of cacodyl oxide in acetic acid, introducing the solution of cacodyl oxide and acetic acid into the cathode compartment of an electrolytic cell, electrolytically reducing the cacodyl oxide to cacodyl, permitting the cacodyl thus formed to separate from the acetic acid, separately withdrawing the cacodyl and acetic acid, and reusing the separated acetic acid for reaction with more arsenic trioxide.

12. The method of continuously converting cacodyl oxide to cacodyl which comprises dissolving the cacodyl oxide in a solvent, electrolytically, reducing the cacodyl oxide to cacodyl in the cathode compartment of an electrolytic cell, permitting the cacodyl to separate from the solvent, and withdrawing the cacodyl, said solvent being an acid selected from the group consisting of acetic acid and acetic anhydride.

BENJAMIN WITTEN.

REFERENCES CITED

The following references are of record in the file of this patent:

UNITED STATES PATENTS

| Number | Name | Date |
|---|---|---|
| 2,110,273 | McKee | Mar. 8, 1938 |

OTHER REFERENCES

Organic Arsenical Compounds, Raiziss and Gavron, 1923, page 63.

Electro-Organic Chemistry, Brockman, pages 171–184, 1926.